(12) United States Patent
Wan et al.

(10) Patent No.: US 10,723,669 B2
(45) Date of Patent: Jul. 28, 2020

(54) SPECIAL FILM-COATED CONTROLLED RELEASE FERTILIZER FOR PEANUT IN HIGH YIELD FIELD AND PREPARATION PROCESS THEREOF

(71) Applicant: Biotechnology Research Center, Shandong Academy of Agricultural Sciences, Jinan, Shandong (CN)

(72) Inventors: Shubo Wan, Shandong (CN); Jialei Zhang, Shandong (CN); Feng Guo, Shandong (CN); Xinguo Li, Shandong (CN); Sha Yang, Shandong (CN); Zheng Zhang, Shandong (CN); Yun Geng, Shandong (CN); Haijun Zhao, Shandong (CN); Jingjing Meng, Shandong (CN)

(73) Assignee: BIOTECHNOLOGY RESEARCH CENTER, SHANDONG ACADEMY OF AGRICULTURAL SCIENCES, Jinan (CN)

( * ) Notice: Subject to any disclaimer, the term of this patent is extended or adjusted under 35 U.S.C. 154(b) by 0 days.

(21) Appl. No.: 16/304,765

(22) PCT Filed: Jul. 20, 2018

(86) PCT No.: PCT/CN2018/096536
§ 371 (c)(1),
(2) Date: Nov. 27, 2018

(87) PCT Pub. No.: WO2019/091142
PCT Pub. Date: May 16, 2019

(65) Prior Publication Data
US 2019/0315663 A1    Oct. 17, 2019

(30) Foreign Application Priority Data

Nov. 13, 2017 (CN) .......................... 2017 1 1110921

(51) Int. Cl.

| | | |
|---|---|---|
| C05G 5/30 | (2020.01) | |
| C05B 7/00 | (2006.01) | |
| C05B 19/00 | (2006.01) | |
| C05C 9/02 | (2006.01) | |
| C05G 3/40 | (2020.01) | |
| C05G 3/80 | (2020.01) | |
| C05C 5/04 | (2006.01) | |
| C05C 9/00 | (2006.01) | |
| C05F 3/00 | (2006.01) | |
| C05F 11/08 | (2006.01) | |
| C08G 69/26 | (2006.01) | |

(52) U.S. Cl.
CPC ................ *C05G 5/37* (2020.02); *C05B 7/00* (2013.01); *C05B 19/00* (2013.01); *C05C 9/02* (2013.01); *C05G 3/40* (2020.02); *C05G 3/80* (2020.02); *C05C 5/04* (2013.01); *C05C 9/005* (2013.01); *C05F 3/00* (2013.01); *C05F 11/08* (2013.01); *C08G 69/26* (2013.01)

(58) Field of Classification Search
CPC ........... C05B 7/00; C05D 3/00; C05G 3/0011; C05G 3/04; C05F 3/00; C05F 11/02; C05C 9/02; A01C 21/005
See application file for complete search history.

(56) References Cited

U.S. PATENT DOCUMENTS

| | | |
|---|---|---|
| 2016/0340266 A1 | 11/2016 | Jablon et al. |
| 2019/0315663 A1 | 10/2019 | Wan et al. |
| 2019/0359534 A1 | 11/2019 | Zhang et al. |

FOREIGN PATENT DOCUMENTS

| | | |
|---|---|---|
| AU | 2018100517 A4 | 5/2018 |
| CN | 103121878 A | 5/2013 |
| CN | 103193546 A | 7/2013 |
| CN | 103420744 A | 12/2013 |
| CN | 103833459 A | 6/2014 |
| CN | 104557282 A | 4/2015 |
| CN | 104817395 A | 8/2015 |
| CN | 104987193 A | 10/2015 |
| CN | 105924294 A | 9/2016 |
| CN | 106083493 A | 11/2016 |
| CN | 106800435 A | 6/2017 |
| CN | 106800476 A | 6/2017 |
| CN | 107082689 A | 8/2017 |
| CN | 107759328 A | 3/2018 |
| CN | 107793224 A | 3/2018 |
| CN | 107827551 A | 3/2018 |
| CN | 107857636 A | 3/2018 |
| NL | 2021724 A | 5/2019 |

OTHER PUBLICATIONS

Written Comment of the International Searching Authority dated Sep. 28, 2018, by the State Intellectual Property Office of the People's Republic of China in corresponding International Patent Application No. PCT/CN2018/096536 and an English Translation of the Written Comment. (8 pages).

International Search Report dated Sep. 28, 2018, by the State Intellectual Property Office of the People's Republic of China in corresponding International Application No. PCT/CN2018/096536 and an English Translation of the Search Report. (8 pages).

*Primary Examiner* — Jennifer A Smith
(74) *Attorney, Agent, or Firm* — Buchanan Ingersoll & Rooney PC

(57) ABSTRACT

The invention relates to the field of controlled release fertilizer technology, and in particular to a special film-coated controlled release fertilizer for peanut in a high yield field, which comprises an outer layer, an intermediate layer and an inner layer, integrates the ingredients for disease and pest control, chemical control, growth promotion and premature senescence prevention, controls the release period, improves the fertilization efficiency without the need of top application throughout the growth period, saves labor cost, and has positive effects on improving peanut yield and quality.

9 Claims, No Drawings

SPECIAL FILM-COATED CONTROLLED RELEASE FERTILIZER FOR PEANUT IN HIGH YIELD FIELD AND PREPARATION PROCESS THEREOF

TECHNICAL FIELD

The invention relates to the field of controlled release fertilizer technology, in particular to a special film-coated controlled release fertilizer for peanut in a high yield field, and further to a preparation process of the special film-coated controlled release fertilizer for peanut in a high yield field.

BACKGROUND

Peanut not only can effectively guarantee the safe supply of edible oil in China, but also is an important agricultural product with strong international competitiveness. With China's accession to the WTO, the domestic market is gradually opening to the international market, foreign agricultural products, such as wheat, corn and soybean, with high mechanization degree, large production scale and low production cost have poured in China, thereby impacting the domestic market. However, peanut still has great price advantages in the world, and has been on velvet in the international market. Its prices steadily rise, and its yield per mu in the same season is higher than other crops. Peanut contributes to developing water saving agriculture, improving soil fertility and protecting the agroecological environment. Developing peanut production is advantageous to the adjustment of agricultural planting structure, and is of significant importance for increasing farmers' income. How to improve peanut yield and quality to increase farmers' income is a problem to be solved by peanut researchers.

Scientific and rational balanced fertilization is one of the key factors to ensure the high yield of peanut. However, according to field investigation, generally there are a few misunderstandings on the fertilization process:

1. Peanut needs a small amount of fertilizer, and the amount of applied fertilizers does not greatly affect the yield.
2. Peanut can be fruited by spreading some urea on a rainy day without application of a base fertilizer.
3. If a large amount of fertilizers is applied, peanut tends to flourishingly grow, thereby wasting labor and material resources.
4. Fertilizers are applied aimlessly before knowing about what nutrients are required by peanut.
5. Fertilizers are spread in a stubble field in advance without centralized application.

18 elements are required for peanut growth, where nitrogen, phosphorus, potassium and calcium are most required, and sulfur, boron, molybdenum, zinc, manganese, iron and other trace elements are also indispensable. Through the growth period of peanut, the nutrient requirements are as follows: in the early stage, nitrogen fertilizer is mainly required, and application of proper amount of nitrogen fertilizer can promote peanut growth and root nodule formation in the seedling stage; in the intermediate stage, calcium fertilizer is mainly required, and is supplemented to contribute to ideotype formation and promote fruit plumpness; and in the later stage, nitrogen and potassium are mainly required, nitrogen fertilizer is supplemented to prevent later fertilizer deficiency, and potassium fertilizer promotes the transport of photosynthate to pod. Nitrogen fertilizer is volatile, phosphate fertilizer has weak ability to permeate upward and downward and migrate or diffuse leftward and rightward in soil, potassium fertilizer antagonizes calcium ions, and the root mass of peanut most actively assimilating nutrients is below the fruiting layer. Therefore, peanut fertilizer is most preferably applied into different layers or released by stages. At present, fertilizers are mainly applied by rationally arranging fertilizer application opportunities, types, quantity and method based on the principle of giving priority to base fertilizer, supplemented by top application, according to the characteristics of peanut's demand for fertilizer and based on the soil fertility. In order to achieve high yield, top application shall be arranged in the middle and later growth stages of peanut, but top application will affect pegging downward and growth. Some fertilizers shall be topdressed under strict conditions, thereby resulting in great difficulties in production. Therefore, top application is labor-consuming and time-consuming.

The prior art provides many solutions for this circumstance, and use of a controlled release fertilizer is one widely used solution thereof, such as a controlled release fertilizer for the flowering stage, a controlled release fertilizer for the growth stage, and a controlled release fertilizer for the fruiting stage. For example, CN105924294A discloses a granular controlled release fertilizer for peanut, the granules of which include three layers of controlled release films, namely, an outer layer controlled release film, an intermediate layer controlled release film and an inner layer controlled release film, wherein the outer side of the outer layer controlled release film is wrapped with a compound fertilizer in the seedling emergence stage, the space between the outer layer controlled release film and the intermediate layer controlled release film is filled with a compound fertilizer for the growth stage, the space between the intermediate layer controlled release film and the inner layer controlled release film is filled with a compound fertilizer for the flowering stage, and the inner layer controlled release film is wrapped with a compound fertilizer for the fruiting stage. The outer layer controlled release film can be degraded into a permeable film in 46 days, has an effective controlled release time of 25-35 days, and consists of the following raw materials in parts by weight: 2 parts of titanium dioxide, 1.5 parts of peat soil, 2 parts of clay, 1.2 parts of superfine delusterant powder wax, 5 parts of erucyl amide, 0.3 part of pentaerythrityl tetrastearate and 105 parts of polyethylene. The intermediate layer controlled release film can be degraded into a permeable film in 12 days, has an effective controlled release time of 47 days, and consists of the following raw materials in parts by weight: 1.6 parts of nanometer silicon dioxide powder, 1.2 parts of turfy soil, 2 parts of calcium carbonate powder, 1.2 parts of superfine delusterant powder wax, 5 parts of erucyl amide, 0.3 part of pentaerythrityl tetrastearate and 105 parts of polyethylene. The inner layer controlled release film can be degraded into a permeable film in 2.5-3.5 days, has an effective controlled release time of 815 days, and consists of the following raw materials in parts by weight: 1.2 parts of aluminium oxide, 2.2 parts of humus soil, 2 parts of calcium carbonate powder, 1.2 parts of superfine delusterant powder wax, 4 parts of erucyl amide, 0.3 part of pentaerythrityl tetrastearate and 115 parts of polyethylene. The controlled release fertilizer for peanut has the following disadvantages: firstly, its effective controlled release time range is 37-57 days, and it is mainly released before the pod-bearing stage without considering the fact that a lot of nutrients are required after the pod-bearing stage, especially in the fruit expansion stage; secondly, there is very little nitrogen in the outer layer, which cannot meet the growth needs in the seedling stage, and there is very little effective calcium in the intermediate layer, which cannot meet the pod growth needs; and thirdly, the release period of the active ingredients cannot very well meet the growth needs of peanut in various growth stages.

At present, there are many researches on controlled release fertilizers for peanut, but there are neither special controlled release fertilizers invented based on nutrient requirements of peanut in various growth stages, nor controlled release fertilizers integrating disease and pest control, chemical control, growth promotion, premature senescence prevention, and the like.

SUMMARY

In order to solve the problems of labor-consuming and time-consuming top application, disease and pest control, chemical control, growth promotion, premature senescence prevention and difficult control over the release period existing in high-yield peanut cultivation, the application provides a special film-coated controlled release fertilizer for peanut in a high yield field that integrates the ingredients for disease and pest control, chemical control and growth promotion, and can control the release period.

The application further provides a preparation process of the special film-coated controlled release fertilizer for peanut in a high yield field.

The invention is implemented using the following measures:

a special film-coated controlled release fertilizer for peanut in a high yield field includes an outer layer, an intermediate layer and an inner layer, where the raw materials in each layer and the proportions thereof are as follows:

the outer layer: 30-50 parts of urea formaldehyde powder, 20-40 parts of fermented livestock and poultry manure, 30-50 parts of urea, 10-15 parts of hyperbranched polyamide, and 0.3-0.5 part of CELEST;

the intermediate layer: 55-75 parts of calcium nitrate, 10-20 parts of ammonium polyphosphate, 0.1-0.3 part of uniconazole, 15-30 parts of humic acid, 0.001-0.1 part of chitosan oligosaccharide, and 65-85 parts of urea formaldehyde powder; and the inner layer: 30-50 parts of potassium dihydrogen phosphate, 40-60 parts of urea, 1-3 parts of seaweed extract, and 20-40 parts of adhesive.

In the special film-coated controlled release fertilizer for peanut in a high yield field, the raw materials in each layer and the proportions thereof are preferably as follows:

the outer layer: 50 parts of urea formaldehyde powder, 20 parts of fermented livestock and poultry manure, 50 parts of urea, 10 parts of hyperbranched polyamide, and 0.5 part of CELEST;

the intermediate layer: 55 parts of calcium nitrate, 20 parts of ammonium polyphosphate, 0.1 part of uniconazole, 30 parts of humic acid, 0.001 part of chitosan oligosaccharide, and 85 parts of urea formaldehyde powder; and the inner layer: 30 parts of potassium dihydrogen phosphate, 60 parts of urea, 1 part of seaweed extract, and 40 parts of adhesive.

In the special film-coated controlled release fertilizer for peanut in a high yield field, the hyperbranched polyamide is preferably an aliphatic hyperbranched polyamide of 2.0, 3.0 or 4.0 branching generation.

In the special film-coated controlled release fertilizer for peanut in a high yield field, the fermented livestock and poultry manure is preferably obtained from the following steps:

mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the pile temperature no longer rises, drying, and pulverizing; and 1 mL of the fermentation agent contains $1-1.5\times10^9$ *Streptococcus thermophilus*, $0.3-0.5\times10^8$ IU neutral protease, $0.1-0.2\times10^6$ IU cellulase, $3-4\times10^5$ IU triacylglycerol acylhydrolase, $1-2\times10^5$ IU beer yeast and $3-4\times10^6$ IU *Bacillus subtilis*.

A preparation process of the special film-coated controlled release fertilizer for peanut in a high yield field includes the following steps:

(1) mixing the raw materials potassium dihydrogen phosphate, urea, seaweed extract and adhesive the inner layer, granulating and drying to obtain granules in the inner layer;

(2) mixing the raw materials calcium nitrate, ammonium polyphosphate, uniconazole, humic acid, chitosan oligosaccharide and urea formaldehyde powder in the intermediate layer, adding the granules in the inner layer obtained in step (1), granulating and drying to obtain granules in the intermediate layer; and (3) mixing the raw materials urea formaldehyde powder, fermented livestock and poultry manure, urea, hyperbranched polyamide and CELEST in the outer layer, adding the granules in the intermediate layer obtained in step (2), granulating and drying.

In an application of the special film-coated controlled release fertilizer for peanut in a high yield field, the soil conditions for planting peanut are preferably as follows:

organic matter content: 10-15 g/kg, alkali-hydrolyzable nitrogen content: 50-90 mg/kg, rapidly available phosphorus content: 60-90 mg/kg, rapidly available potassium content: 80-130 mg/kg, exchangeable calcium content: 6-12 mg/kg, moisture content from seeding time to seedling stage: 60-70%, moisture content from flowering stage to pod-bearing stage: 70-80%, moisture content from fruit expansion stage to maturation stage: 60-70%.

In the application, the film-coated controlled release fertilizer is preferably applied at a rate of 50±2 kg/Mu along with seeding or rotary tillage before seeding.

CELEST is a suspension seed coating agent containing 2.5% fludioxonil (international generic name), and can be used for controlling a plurality of seed-borne and soil-borne fungal diseases of crops.

Repeated trials show that when urea formaldehyde powder is used together with fermented livestock and poultry manure and urea, and the use levels of fermented livestock and poultry manure and urea are more than a certain proportion, the release rate in early stage is increased, which does not contribute to realization of the controlled release effect. Therefore, a small amount of hyperbranched polyamide, if mixed therewith, can guarantee low release rate in early stage and improve the controlled release effect whilst improving the proportions of fermented livestock and poultry manure and urea.

The invention has the following beneficial effects:

(1) the fertilizer is applied as a seed fertilizer. The fertilizer releases CELEST in the seedling stage to prevent damping off, stem rot and the like, and releases nitrogen in the seedling stage to promote growth and promote root nodule formation by rhizobial infection. In about 50 days (pegging stage) after seeding, calcium fertilizer is released, and ammonium polyphosphate is an active synergistic factor capable of promoting long-acting release of calcium ions. In about 50 days (pegging stage) after seeding, a chemical control agent is released to inhibit flourishing growth of overgound parts, and to prevent premature senescence caused by chemical control together with humic acid and chitosan oligosaccharide. In about 90 days (fruit expansion stage) after seeding, by sustained release of potassium dihydrogen phosphate, nitrogen and seaweed extract, the fertilizer prevents later fertilizer deficiency caused by *rhizobium* rupture, promotes accumulation of photosynthate, and enhances pod plumpness.

(2) The fertilizer integrates the ingredients for disease and pest control, chemical control, growth promotion, and premature senescence prevention, controls the release period, improves fertilization efficiency without the need of top application throughout the growth period, and saves labor cost.

(3) By regulation of the controlled release formula, the fertilizer closely combines disease and pest control, chemical control and growth-promoting ingredient release with the growth stages of peanut, and has positive effects on improving peanut yield and quality.

DESCRIPTION OF THE EMBODIMENTS

In order to better understand the invention, the invention is further described below in conjunction with the examples.

Example 1

A special film-coated controlled release fertilizer for peanut in a high yield field includes an outer layer, an intermediate layer and an inner layer, where the raw materials in each layer and the proportions thereof are as follows:

the outer layer: 30 parts of urea formaldehyde powder, 40 parts of fermented livestock and poultry manure, 30 parts of urea, 15 parts of hyperbranched polyamide, and 0.3 part of CELEST;

the intermediate layer: 75 parts of calcium nitrate, 10 parts of ammonium polyphosphate, 0.3 part of uniconazole, 15 parts of humic acid, 0.1 part of chitosan oligosaccharide, and 65 parts of urea formaldehyde powder; and the inner layer: 50 parts of potassium dihydrogen phosphate, 40 parts of urea, 3 parts of seaweed extract, and 20 parts of adhesive.

The hyperbranched polyamide is an aliphatic hyperbranched polyamide of 2.0 branching generation.

Preparation Process (1) mixing the raw materials potassium dihydrogen phosphate, urea, seaweed extract and adhesive in the inner layer, granulating and drying to obtain granules in the inner layer;

(2) mixing the raw materials calcium nitrate, ammonium polyphosphate, uniconazole, humic acid, chitosan oligosaccharide and urea formaldehyde powder in the intermediate layer, adding the granules in the inner layer obtained in step (1), granulating and drying to obtain granules in the intermediate layer; and (3) mixing the raw materials urea formaldehyde powder, fermented livestock and poultry manure, urea, hyperbranched polyamide and CELEST in the outer layer, adding the granules in the intermediate layer obtained in step (2), granulating and drying.

Example 2

A special film-coated controlled release fertilizer for peanut in a high yield field includes an outer layer, an intermediate layer and an inner layer, where the raw materials in each layer and the proportions thereof are as follows:

the outer layer: 30 parts of urea formaldehyde powder, 40 parts of fermented livestock and poultry manure, 30 parts of urea, 15 parts of hyperbranched polyamide, and 0.3 part of CELEST;

the intermediate layer: 75 parts of calcium nitrate, 10 parts of ammonium polyphosphate, 0.3 part of uniconazole, 15 parts of humic acid, 0.1 part of chitosan oligosaccharide, and 65 parts of urea formaldehyde powder; and the inner layer: 50 parts of potassium dihydrogen phosphate, 40 parts of urea, 3 parts of seaweed extract, and 20 parts of adhesive.

The hyperbranched polyamide is an aliphatic hyperbranched polyamide of 3.0 branching generation.

The preparation process is the same as that in Example 1.

Example 3

A special film-coated controlled release fertilizer for peanut in a high yield field includes an outer layer, an intermediate layer and an inner layer, where the raw materials in each layer and the proportions thereof are as follows:

the outer layer: 30 parts of urea formaldehyde powder, 40 parts of fermented livestock and poultry manure, 30 parts of urea, 15 parts of hyperbranched polyamide, and 0.3 part of CELEST;

the intermediate layer: 75 parts of calcium nitrate, 10 parts of ammonium polyphosphate, 0.3 part of uniconazole, 15 parts of humic acid, 0.1 part of chitosan oligosaccharide, and 65 parts of urea formaldehyde powder; and the inner layer: 50 parts of potassium dihydrogen phosphate, 40 parts of urea, 3 parts of seaweed extract, and 20 parts of adhesive.

The hyperbranched polyamide is an aliphatic hyperbranched polyamide of 4.0 branching generation.

The preparation process is the same as that in Example 1.

Example 4

A special film-coated controlled release fertilizer for peanut in a high yield field includes an outer layer, an intermediate layer and an inner layer, where the raw materials in each layer and the proportions thereof are as follows:

the outer layer: 50 parts of urea formaldehyde powder, 20 parts of fermented livestock and poultry manure, 50 parts of urea, 10 parts of hyperbranched polyamide, and 0.5 part of CELEST;

the intermediate layer: 55 parts of calcium nitrate, 20 parts of ammonium polyphosphate, 0.1 part of uniconazole, 30 parts of humic acid, 0.001 part of chitosan oligosaccharide, and 85 parts of urea formaldehyde powder; and the inner layer: 30 parts of potassium dihydrogen phosphate, 60 parts of urea, 1 part of seaweed extract, and 40 parts of adhesive.

The hyperbranched polyamide is an aliphatic hyperbranched polyamide of 2.0 branching generation.

The preparation process is the same as that in Example 1.

Example 5

A special film-coated controlled release fertilizer for peanut in a high yield field includes an outer layer, an intermediate layer and an inner layer, where the raw materials in each layer and the proportions thereof are as follows:

the outer layer: 50 parts of urea formaldehyde powder, 20 parts of fermented livestock and poultry manure, 50 parts of urea, 10 parts of hyperbranched polyamide, and 0.5 part of CELEST;

the intermediate layer: 55 parts of calcium nitrate, 20 parts of ammonium polyphosphate, 0.1 part of uniconazole, 30 parts of humic acid, 0.001 part of chitosan oligosaccharide, and 85 parts of urea formaldehyde powder; and the inner layer: 30 parts of potassium dihydrogen phosphate, 60 parts of urea, 1 part of seaweed extract, and 40 parts of adhesive.

The hyperbranched polyamide is an aliphatic hyperbranched polyamide of 3.0 branching generation.

The preparation process is the same as that in Example 1.

Example 6

A special film-coated controlled release fertilizer for peanut in a high yield field includes an outer layer, an intermediate layer and an inner layer, where the raw materials in each layer and the proportions thereof are as follows:

the outer layer: 50 parts of urea formaldehyde powder, 20 parts of fermented livestock and poultry manure, 50 parts of urea, 10 parts of hyperbranched polyamide, and 0.5 part of CELEST;

the intermediate layer: 55 parts of calcium nitrate, 20 parts of ammonium polyphosphate, 0.1 part of uniconazole, 30 parts of humic acid, 0.001 part of chitosan oligosaccharide, and 85 parts of urea formaldehyde powder; and the inner layer: 30 parts of potassium dihydrogen phosphate, 60 parts of urea, 1 part of seaweed extract, and 40 parts of adhesive.

The hyperbranched polyamide is an aliphatic hyperbranched polyamide of 4.0 branching generation.

The preparation process is the same as that in Example 1.

Example 7

A special film-coated controlled release fertilizer for peanut in a high yield field includes an outer layer, an intermediate layer and an inner layer, where the raw materials in each layer and the proportions thereof are as follows:

the outer layer: 40 parts of urea formaldehyde powder, 30 parts of fermented livestock and poultry manure, 40 parts of urea, 13 parts of hyperbranched polyamide, and 0.4 part of CELEST;

the intermediate layer: 60 parts of calcium nitrate, 15 parts of ammonium polyphosphate, 0.2 part of uniconazole, 25 parts of humic acid, 0.1 part of chitosan oligosaccharide, and 75 parts of urea formaldehyde powder; and the inner layer: 40 parts of potassium dihydrogen phosphate, 50 parts of urea, 2 parts of seaweed extract, and 30 parts of adhesive.

The hyperbranched polyamide is an aliphatic hyperbranched polyamide of 2.0 branching generation.

The preparation process is the same as that in Example 1.

Example 8

A special film-coated controlled release fertilizer for peanut in a high yield field includes an outer layer, an intermediate layer and an inner layer, where the raw materials in each layer and the proportions thereof are as follows:

the outer layer: 40 parts of urea formaldehyde powder, 30 parts of fermented livestock and poultry manure, 40 parts of urea, 13 parts of hyperbranched polyamide, and 0.4 part of CELEST;

the intermediate layer: 60 parts of calcium nitrate, 15 parts of ammonium polyphosphate, 0.2 part of uniconazole, 25 parts of humic acid, 0.1 part of chitosan oligosaccharide, and 75 parts of urea formaldehyde powder; and the inner layer: 40 parts of potassium dihydrogen phosphate, 50 parts of urea, 2 parts of seaweed extract, and 30 parts of adhesive.

The hyperbranched polyamide is an aliphatic hyperbranched polyamide of 3.0 branching generation.

The preparation process is the same as that in Example 1.

Example 9

A special film-coated controlled release fertilizer for peanut in a high yield field includes an outer layer, an intermediate layer and an inner layer, where the raw materials in each layer and the proportions thereof are as follows:

the outer layer: 40 parts of urea formaldehyde powder, 30 parts of fermented livestock and poultry manure, 40 parts of urea, 13 parts of hyperbranched polyamide, and 0.4 part of CELEST;

the intermediate layer: 60 parts of calcium nitrate, 15 parts of ammonium polyphosphate, 0.2 part of uniconazole, 25 parts of humic acid, 0.1 part of chitosan oligosaccharide, and 75 parts of urea formaldehyde powder; and the inner layer: 40 parts of potassium dihydrogen phosphate, 50 parts of urea, 2 parts of seaweed extract, and 30 parts of adhesive.

The hyperbranched polyamide is an aliphatic hyperbranched polyamide of 4.0 branching generation.

The preparation process is the same as that in Example 1.

Examples 1, 2 and 3 are different in that hyperbranched polyamides of different branching generations were used, Examples 4, 5 and 6 are different in that hyperbranched polyamides of different branching generations were used, and Examples 7, 8 and 9 are different in that hyperbranched polyamides of different branching generations were used.

Comparison Example 1

The Comparison Example 1 is the same as Example 1 except that in the raw materials in the outer layer, hyperbranched polyamide was not used, the use level of urea formaldehyde powder was changed to 35 parts, the use level of fermented livestock and poultry manure was changed to 45 parts, and the use level of urea was changed to 35 parts.

Research on Controlled Release Properties

Controlled release properties of the active ingredients in the controlled release fertilizer prepared in the Examples 1-9 are evaluated using the soil culture method. The specific operation is as follows:

The controlled release fertilizer packed in a nylon net was applied to soil including organic matter content: 12.3 g/kg, alkali-hydrolyzable nitrogen content: 70.5 mg/kg, readily available phosphorus content: 76.8 mg/kg, readily available potassium content: 103.2 mg/kg and exchangeable calcium content: 8.3 mg/kg, the fertilizer weight was measured at regular intervals, and then the active ingredients were converted to obtain the contents of the active ingredients released from the controlled release fertilizer, which were compared with the nutrient requirements of peanut in various growth stages.

The soil temperature and humidity of peanut in various stages were controlled as follows: daily average ground temperature: 15-20° C., moisture content: 60-70% in the early stage (seeding time to seedling stage); daily average ground temperature: 20-28° C., moisture content 70-80% in the intermediate stage (flowering stage to pod-bearing stage); and the daily average ground temperature: 28-35° C., moisture content: 60-70% in the later stage (fruit expansion stage to maturation stage).

| | Cumulative release rate of active ingredients on different days (%) | | | | | | | | |
|---|---|---|---|---|---|---|---|---|---|
| | 10 d | 30 d | 40 d | 55 d | 70 d | 85 d | 100 d | 115 d | 130 d |
| | | | | Processing | | | | | |
| | Before seedling stage | Seedling stage | Flowering stage | Pegging stage | Pod-bearing stage | Fruit expansion stage | | Maturation stage | |
| Example 1 | 7.5 | 14.6 | 28.4 | 45.3 | 54.3 | 67.4 | 75.4 | 80.8 | 86.2 |
| Example 2 | 6.8 | 13.5 | 25.3 | 40.4 | 50.2 | 63.2 | 69.7 | 77.5 | 83.5 |
| Example 3 | 5.4 | 10.1 | 21.7 | 32.8 | 45.3 | 56.4 | 65.3 | 73.7 | 82.1 |
| Example 4 | 9.7 | 20.4 | 37.2 | 45.6 | 50.5 | 65.3 | 78.9 | 89.7 | 90.7 |
| Example 5 | 8.5 | 17.7 | 32.7 | 41.2 | 47.2 | 64.6 | 76.7 | 85.3 | 90.5 |
| Example 6 | 6.4 | 13.5 | 28.5 | 38.7 | 43.3 | 60.3 | 71.5 | 79.4 | 84.6 |
| Example 7 | 7.1 | 13.4 | 27.8 | 42.6 | 53.7 | 66.4 | 72.8 | 78.6 | 85.7 |
| Example 8 | 6.2 | 11.6 | 25.7 | 38.6 | 50.5 | 63.5 | 70.2 | 76.3 | 82.5 |
| Example 9 | 5.8 | 10.8 | 23.5 | 37.8 | 45.3 | 58.5 | 64.5 | 71.5 | 80.1 |
| Comparison Example 1 | 9.1 | 19.4 | 35.6 | 55.2 | 66.8 | 76.5 | 88.3 | 90.2 | 92.1 |

By referring to the cumulative release rate of active ingredients on different days in various examples, the release amount of the active ingredients in Examples 4, 5 and 6 can very well comply with the demand for active ingredients of peanut in various growth stages, and can meet different demands for active ingredients of peanut in various growth stages. In Examples 1, 2 and 3, as well as Examples 7, 8 and 9, the fertilizer is slowly released in the early stage, fast released in the intermediate stage, and insufficiently released in the later stage, thereby resulting in waste of active ingredients. Compared with Examples 4, 5 and 6, in Example 4, the fertilizer is slightly fast released, and a few active ingredients are released after the fruit expansion stage, thereby failing to very well meet the nutrient requirements in the later stage; and in Example 6, the fertilizer is slightly slowly released, and the active ingredients are unable to be released in time in the later stage, thereby resulting in waste. Compared with Example 1, in Comparison Example 1, in the raw materials in the outer layer, hyperbranched polyamide was not added, and the fertilizer was fast released in the early stage, so that the release of the active components in each layer cannot well comply with the demand for active ingredients of peanut in various growth stages.

Effects on Pod Yield and Seed Kernel Quality

A field experiment was carried out in a high yield field of Jiyang Test Station, where the soil includes organic matter content: 13.5 g/kg, alkali-hydrolyzable nitrogen content: 60.9 mg/kg, readily available phosphorus content: 75.2 mg/kg, readily available potassium content: 95.4 mg/kg and exchangeable calcium content: 9.1 mg/kg, by applying the controlled release fertilizer in the examples to an experimental material Huayu No. 22 along with seeding at a rate of 50 kg/Mu, and a common NPK compound fertilizer (15-15-15) was used as a control at a rate of 50 kg/Mu. The experiment was carried out by seeding on May 5 in an area of 33.3 m$^2$, mulched ridge-furrow cultivation, and harvesting on September 26, and was repeated 3 times.

| | Processing | | | | | | |
|---|---|---|---|---|---|---|---|
| | Pod yield (kg/667 m$^2$) | Wormy fruit rate (%) | Plump fruit rate (%) | Kernel rate (%) | Protein content (%) | Fat content (%) | O/L |
| Control | 410.5 | 15.4 | 61.8 | 67.4 | 23.5 | 50.2 | 1.38 |
| Example 1 | 472.3 | 8.5 | 69.3 | 69.4 | 24.4 | 51.5 | 1.47 |
| Example 2 | 463.5 | 5.4 | 68.4 | 69.2 | 24.6 | 51.2 | 1.45 |
| Example 3 | 434.2 | 6.7 | 66.2 | 68.4 | 24.2 | 50.5 | 1.47 |
| Example 4 | 492.7 | 3.6 | 71.7 | 71.0 | 25.5 | 51.9 | 1.50 |
| Example 5 | 502.2 | 2.9 | 74.5 | 72.4 | 25.4 | 52.3 | 1.52 |
| Example 6 | 473.5 | 3.8 | 72.3 | 71.2 | 25.1 | 52.2 | 1.49 |
| Example 7 | 465.3 | 7.9 | 68.7 | 69.2 | 24.5 | 51.7 | 1.46 |
| Example 8 | 458.2 | 8.2 | 67.5 | 68.6 | 24.7 | 51.3 | 1.45 |
| Example 9 | 440.5 | 6.7 | 67.3 | 68.5 | 24.6 | 50.8 | 1.42 |
| Comparison Example 1 | 422.6 | 3.4 | 65.7 | 68.3 | 23.9 | 50.4 | 1.42 |

In Examples 4, 5 and 6, the pod yield, plump fruit rate and kernel rate are high, the wormy fruit rate is low, the protein and fat contents are relatively high, and the O/L is high, where the effect of Example 5 is the most significant. In Example 5, about the control sample, the pod yield was increased by 22.3%, the plump fruit rate was increased by 20.6%, the kernel rate was increased by 7.4%, the protein content was increased by 1.9%, the fat content was increased by 2.1%, the O/L was increased by 10.1%, and the quality was significantly improved. Both the pod yield and quality in the Comparison Example 1 are slightly worse than those in Examples 1-9.

As can be seen from the comparison of the cumulative release rate of active ingredients, pod yield and seed kernel quality in the above two tables, the controlled release fertilizer according to the application enables the active ingredient release to comply with nutrient requirements in the peanut growth period by selection and optimization of controlled release ingredients, integrates the ingredients for disease and pest control, chemical control, growth promotion and premature senescence prevention, improves the fertilizer efficiency without the need of top application throughout the growth period, and saves labor cost. The fertilizer can significantly improve the pod yield and seed kernel quality, is an efficient special controlled release fertilizer for peanut contributing to high yield and high quality, and has very high popularization and application values.

The above examples are preferred embodiments of the invention, but the embodiments of the invention are not limited to the examples. All alterations, modifications, combinations, substitutions and simplifications made without departing from the spiritual essence and principle of the invention shall be equivalent substitution modes, and shall be encompassed within the scope of protection of the invention.

What is claimed is:

1. A film-coated controlled release fertilizer for peanut in a high yield field, comprising an outer layer, an intermediate layer and an inner layer, wherein the raw materials in each layer and the proportions thereof are as follows:
   the outer layer: 30-50 parts of urea formaldehyde powder, 20-40 parts of fermented livestock and poultry manure, 30-50 parts of urea, 10-15 parts of hyperbranched polyamide, and 0.3-0.5 part of a suspension seed coating agent containing 2.5% fludioxonil;
   the intermediate layer: 55-75 parts of calcium nitrate, 10-20 parts of ammonium polyphosphate, 0.1-0.3 part of uniconazole, 15-30 parts of humic acid, 0.001-0.1 part of chitosan oligosaccharide, and 65-85 parts of urea formaldehyde powder; and
   the inner layer: 30-50 parts of potassium dihydrogen phosphate, 40-60 parts of urea, 1-3 parts of seaweed extract, and 20-40 parts of adhesive.

2. The film-coated controlled release fertilizer for peanut in a high yield field according to claim 1, wherein the raw materials in each layer and the proportions thereof are as follows:
   the outer layer: 50 parts of urea formaldehyde powder, 20 parts of fermented livestock and poultry manure, 50 parts of urea, 10 parts of hyperbranched polyamide, and 0.5 part of a suspension seed coating agent containing 2.5% fludioxonil;
   the intermediate layer: 55 parts of calcium nitrate, 20 parts of ammonium polyphosphate, 0.1 part of uniconazole, 30 parts of humic acid, 0.001 part of chitosan oligosaccharide, and 85 parts of urea formaldehyde powder; and
   the inner layer: 30 parts of potassium dihydrogen phosphate, 60 parts of urea, 1 part of seaweed extract, and 40 parts of adhesive.

3. The film-coated controlled release fertilizer for peanut in a high yield field according to claim 1, wherein the hyperbranched polyamide is an aliphatic hyperbranched polyamide of 2.0, 3.0 or 4.0 branching generation.

4. The film-coated controlled release fertilizer for peanut in a high yield field according to claim 1, wherein the fermented livestock and poultry manure is obtained from the following steps:
   mixing 2-5 parts of chicken manure, 2-5 parts of sheep manure and 2-5 parts of cow dung at a weight ratio to obtain a blended manure, chopping crop stalks into 5-8 cm small fragments, fully mixing the crop stalks with the blended manure at a weight ratio of 2:8, stacking them in a 1.5-2 m wide and 0.8-1.2 m tall pile, inserting a temperature gauge into the pile to measure the temperature; then adding a fermentation agent (0.2% of the total mass) in a manner of adding ⅙-¼ of the fermentation agent to a layer of 20-25 cm height piled in the process of piling until piling up to 0.8-1.2 m, adding water to reach 50-60% moisture content, fermenting, turning over the pile when the temperature rises to more than 60° C. until the stock pile temperature no longer rises, drying, and pulverizing;
   wherein 1 mL of the fermentation agent contains $1$-$1.5 \times 10^9$ Streptococcus thermophilus, $0.3$-$0.5 \times 10^8$ IU neutral protease, $0.1$-$0.2 \times 10^6$ IU cellulase, $3$-$4 \times 10^5$ IU triacylglycerol acylhydrolase, $1$-$2 \times 10^5$ IU beer yeast and $3$-$4 \times 10^6$ IU Bacillus subtilis.

5. A preparation process of the film-coated controlled release fertilizer for peanut in a high yield field according to claim 1, comprising the following steps:
   (1) mixing the raw materials potassium dihydrogen phosphate, urea, seaweed extract and adhesive in the inner layer, granulating and drying to obtain granules in the inner layer;
   (2) mixing the raw materials calcium nitrate, ammonium polyphosphate, uniconazole, humic acid, chitosan oligosaccharide and urea formaldehyde powder in the intermediate layer, adding the granules in the inner layer obtained in step (1), granulating and drying to obtain granules in the intermediate layer; and
   (3) mixing the raw materials urea formaldehyde powder, fermented livestock and poultry manure, urea, hyperbranched polyamide and a suspension seed coating agent containing 2.5% fludioxonil in the outer layer, adding the granules in the intermediate layer obtained in step (2), granulating and drying.

6. An application of the film-coated controlled release fertilizer for peanut in a high yield field according to claim 1, wherein soil conditions for planting peanut are as follows: organic matter content: 10-15 g/kg, alkali-hydrolyzable nitrogen content: 50-90 mg/kg, rapidly available phosphorus content: 60-90 mg/kg, rapidly available potassium content: 80-130 mg/kg, exchangeable calcium content: 6-12 mg/kg, moisture content from seeding time to seedling stage: 60-70%, moisture content from flowering stage to pod-bearing stage: 70-80%, moisture content from fruit expansion stage to maturation stage: 60-70%.

7. The application according to claim 6, wherein the film-coated controlled release fertilizer is applied at a rate of 50±2 kg/Mu along with seeding or rotary tillage before seeding.

8. An application of a film-coated controlled release fertilizer for peanut in a high yield field obtained from the preparation process according to claim 5, wherein soil conditions for planting peanut are as follows: organic matter content: 10-15 g/kg, alkali-hydrolyzable nitrogen content:

50-90 mg/kg, rapidly available phosphorus content: 60-90 mg/kg, rapidly available potassium content: 80-130 mg/kg, exchangeable calcium content: 6-12 mg/kg, moisture content from seeding time to seedling stage: 60-70%, moisture content from flowering stage to pod-bearing stage: 70-80%, moisture content from fruit expansion stage to maturation stage: 60-70%.

9. The application according to claim 8, wherein the film-coated controlled release fertilizer is applied at a rate of 50±2 kg/Mu along with seeding or rotary tillage before seeding.

* * * * *